United States Patent [19]

Thomas et al.

[11] 3,993,604

[45] Nov. 23, 1976

[54] ALICYCLIC COMPOUNDS, THEIR USE AND PROCESS FOR PREPARING SAME

[75] Inventors: Alan Francis Thomas, Geneva; Günther Ohloff, Bernex, Geneva, both of Switzerland

[73] Assignee: Firmenich S.A., Geneva, Switzerland

[22] Filed: May 21, 1974

[21] Appl. No.: 471,839

[30] Foreign Application Priority Data
June 7, 1973 Switzerland.......................... 8248/73

[52] U.S. Cl................................ 252/522; 252/89 R; 260/488 R; 260/611 R; 260/617 R; 426/538
[51] Int. Cl.$^2$........................ A61K 7/46; C11B 9/00
[58] Field of Search..................................... 252/522

[56] References Cited
UNITED STATES PATENTS
3,514,489   5/1970   Lemberg............................ 252/522

Primary Examiner—C. Davis
Attorney, Agent, or Firm—Pennie & Edmonds

[57] ABSTRACT

Use of alicyclic compounds, some of which are new, as odor-modifying ingredients for manufacturing perfumes, perfumed products or synthetic essential oils, and as flavor-modifying ingredients for the manufacture of artificial flavors or for the aromatization of foodstuffs, animal feeds, pharmaceutical preparations or tobacco products.

Process for preparing said alicyclic compounds.

6 Claims, No Drawings

ALICYCLIC COMPOUNDS, THEIR USE AND PROCESS FOR PREPARING SAME

SUMMARY OF THE INVENTION

The present invention relates to new alicyclic compounds of formula

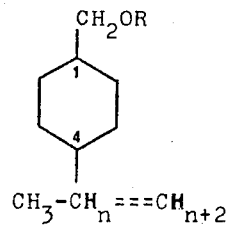

possessing a single or a double bond in the position indicated by the dotted line, and wherein the index $n$ stands for the integers zero or one, and the symbol R represents an alkyl or an acyl radical containing from 1 to 6 carbon atoms.

The invention also relates to the use of alicyclic compounds of formula

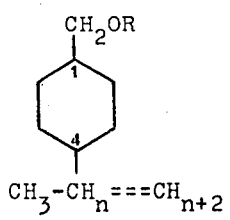

possessing a single or a double bond in the position indicated by the dotted line, and wherein the index n stands for the integers zero or one, and the symbol R represents a hydrogen atom, or an alkyl or an acyl radical containing from 1 to 6 carbon atoms, as odour- and flavour-modifying ingredients.

The invention further relates to a perfume or a flavour-modifying composition comprising as an active ingredient at least one compound of formula I$b$, as set forth hereinabove.

The invention finally relates to a process for preparing an alicyclic compound of formula

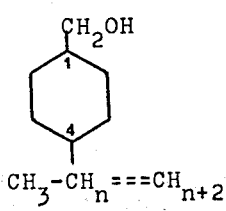

possessing a single or a double bond in the position indicated by the dotted line, and wherein the index $n$ stands for the integers zero or one, which comprises A. reducing 4-isopropenyl-cyclohex-1-enylmethanol by means of sodium metal in liquid ammonia in order to obtain a compound of formula I$c$ possessing a double bond in the position indicated by the dotted line and wherein the index $n$ is zero; or B. reducing 4-isopropenyl-cyclohex-1-enylmethanol by means of a catalytic hydrogenation in order to obtain a compound of formula I$c$ possessing a single bond in the position indicated by the dotted line and wherein the index $n$ is one; or C. reducing 4-isopropyl-benzaldehyde by means of a catalytic hydrogenation carried out at elevated pressure in order to obtain a compound of formula I$c$ as set forth under letter B.

BACKGROUND OF THE INVENTION

Among the variety of alicyclic compounds which can be used according to the present invention, 4-isopropenylcyclohexylmethanol is a naturally occurring compound. Both its cis and trans isomers have been in fact identified in the essential oil of Perilla acuta var. viridis. More precisely, these isomers were found to occur in the essential oil in the proportion of 2–8% and up to 0.6% by weight, respectively, depending on the origin and the purity of the said essential oil — see Nippon Nogei Kagaku Kaishi 1970, 428, reported in Chem. Abstr. 74, 57198 (1971).

It has now been first discovered that, with respect to their odoriferous and gustative properties, both the cis and trans isomers greatly differ from perilla oil. They equally differ from known perilla aldehyde, the major constituent thereof. Perilla aldehyde has been currently used in perfumery and in the flavour industry in order to confer a typically spicy, fatty and slightly green note to the products in which it has been incorporated — cf. S. Arctander, Perfumes and Flavor Chemicals, Montclair, N.J. (1969) and E. Glide — meister & F. Hoffmann, Die Aetherischen Oele, Akademie Verlag, Berlin 1956.

Equally it has now been discovered that the odoriferous properties of cis-4-isopropenyl-cyclohexylmethanol greatly differ from those of its corresponding trans isomer. Whereas trans-4-isopropenyl-cyclohexylmethanol may be characterized by a "chemical" odour, e.g. reminiscent of that of phenol or that of certain aromatic hydrocarbons, cis-4-isopropenyl-cyclohexylmethanol possesses an original flowery odour reminiscent of that developed by the lily of the valley. This particularly pleasant odour possesses moreover a slightly diffused animal undertone reminiscent of certain aspects of the odour of castoreum.

In the field of flavours on the contrary, the above two isomers do not differ so much one from the other. Both the cis and trans isomers may be characterized by a flowery gustative note which in the case of cis-4-isopropenyl-cyclohexylmethanol possesses a slightly green character. Trans-4-isopropenyl-cyclohexylmethanol possesses in addition a more or less pronounced woody character.

PREFERRED EMBODIMENTS OF THE INVENTION

4-Isopropenyl-cyclohexylmethanol possesses not only useful properties on its own but it may be equally useful as starting material for the preparation of certain of its derivatives which equally show useful organoleptic properties. It has now been discovered in fact that the corresponding saturated alcohols, as well as their ester and ether derivatives, develop interesting odoriferous and flavouring properties.

In the art of perfumery for example, alicyclic derivatives I$b$ are characterized by an original flowery note reminiscent in some instances of that of cyclamen or lily of the valley. Depending on the nature of the composition in which they are incorporated, or depending on the proportions used, compounds Ib may validly enhance or develop various olfactive notes such as, e.g. flowery, fruity, green, spicy, woody or even slightly animal notes. Compounds Ib are equally appreciated for the reconstitution of numerous floral essential oils such as rose oil, jasmin oil, lily of the valley or cyclamen oil e.g. It was moreover discovered that the said compounds, when used in perfumes of the "Chypre" type, possessed an interesting fixative effect, particularly well defined on the flowery notes of the said perfumes.

Compounds Ib are equally useful as odour-modifying ingredients for the preparation of perfumed products such as soaps, detergents, waxes, cleaning products or cosmetic preparations.

When alicyclic compounds Ib are used as odour-modifying ingredients in perfume compositions, interesting olfactive effects may be achieved by using them in proportions comprised between about 0.5 and 5% of the total weight of the said composition. Depending on the effect desired or on the nature of the other constituents of the given composition, concentrations as low as 0.05%, or as high as 10, 20 or even 30% (parts by weight) can also be used.

In the art of flavours, compounds Ib may be characterized by a green, slightly flowery and fruity gustative note. According to the nature of the products in which they are incorporated, they can develop or enhance various gustative notes, such as fruity, flowery, woody or even fatty notes. Compounds Ib are particularly appreciated for the preparation of artifical flavours such as melon or apricot type flavours.

These features were found to be advantageously suitable for the aromatization of solid or liquid foodstuffs such as syrup, jams, milk beverages, puddings, ice-creams or even bakery and confectionery products. Moreover, compounds Ib can be used for flavouring various tobacco products.

The term "foodstuff" is here used broadly and includes also products such as coffee, tea or chocolate.

Depending on the nature of the flavoured material or on the effect desired, the proportions used may vary within a wide range and may be, for example, of the order of 1 ppm to 1%, based on the total weight of said flavoured material, the most interesting effects being achieved by the use of proportions comprised between 50 and 100 ppm. When compounds Ib are used as ingredients for the preparation of artificial flavours, they can be used in proportions comprised between 0.1 and 10, or even 15 to 20% of the total weight of the given composition.

In all the above cases however, depending on the effect desired, smaller or greater proportions than those given above may equally be used.

Compounds Ib belong to the class of 1,4-disubstituted cyclohexane derivatives and as a consequence they display a cyclanic stereoisomerism. It has to be appreciated that in the course of the present description, the given formulae are deemed to represent a compound in which the isopropyl or isopropenyl group at position 4 can present a cis or trans configuration relative to the substituent at position 1, as well as any mixture thereof. This fact may be visualized as indicated hereinbelow for 4-isopropyl-cyclohexylmethanol:

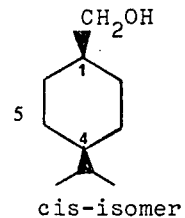 and 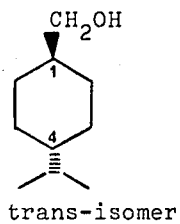

cis-isomer   trans-isomer

In accordance with the invention the compounds of formula Ib may be used in their pure isomeric state.

However, for any practical and economical reason, mixtures of isomers, as obtained directly from the process for their preparation, may be conveniently used, the olfactive and gustative properties of said mixtures being often similar to those of the individual isomers.

We observed however an exception to this principle. As stated above, in fact, the cis and trans isomers of 4-isopropenyl-cyclohexylmethanol greatly differ one from the other, the most interesting olfactive effect being achieved by the use of a pure cis-4-isopropenyl-cyclohexylmethanol. Any mixture comprising the cis isomer together with a minor amount of the trans isomer can however be used for current application in the field of perfumery or flavours.

The disadvantages and difficulties inherent in the isolation of the cis- and trans-4-isopropenyl-cyclohexylmethanol from the natural essential oil have been overcome by the realization of appropriate synthetic methods for their preparation. The process, which represents one of the objects of the present invention, is economically and industrially more advantageous than the known synthetic method, this latter consisting in the reduction of perilla aldehyde, and expensive material of natural origin [c.f. Agr. Biol. Chem. 33, 86 (1969)].

According to one of the embodiments of the present invention, alicyclic compounds Ia are prepared by reducing a compound of formula

i.e. 4-isopropenyl-cyclohex-1-enylmethanol, known in the art under the name of "perilla alcohol", — see e.g. E. Gildemeister & F. Hoffmann, op. cit. p. 111.

The said reduction may be carried out in accordance with the usual techniques, for example by means of sodium metal in liquid ammonia according to the Birch method [see e.g. H. O. House, Modern Synthetic Reactions, W. A. Benjamin Inc., New York (1965) p. 507.

According to a preferred embodiment of the process of the invention the reduction is carried out in the presence of ethyl alcohol. Sodium metal may equally react in aqueous ammonia in the presence of an inert organic solvent, benzene for example [Agr. Biol. Chem. 33, 86 (1969)].

By effecting the reduction of 4-isopropenyl-cyclohex-1-enylmethanol as hereinabove described, one obtains mixtures of cis- and trans-4-isopropenyl-cyclohexylmethanol with a higher content of the cis isomer ( ≥ 70%).

A subsequent purification of the obtained mixture, e.g. by means of a fractional distillation on a spinning band column, exables the separation of its constituents and the isolation of pure cis-4-isopropenyl-cyclohexyl-methanol.

According to another embodiment of the process of the present invention, 4-isopropenyl-cyclohex-1-enyl-methanol is catalytically hydrogenated in accordance with the usual techniques, e.g. in the presence of a metal catalyst such as platinum dioxyde, Raney nickel or palladium on carbon. Mixtures of cis- and trans-4-isopropyl-cyclohexylmethanol were thus obtained. The pure cis or trans isomers may be isolated from the obtained mixtures by the common purification techniques, e.g. by means of a careful fractional distillation.

According to a further embodiment of the present invention, 4-isopropenyl-cyclohex-1-enylmethanol, used as starting material in the above described process, is prepared by reacting β-pinene-epoxide with an acidic reagent.

The said reaction may be carried out in accordance with the usual techniques [see e.g.: The Chemistry of the Ether Linkage, Interscience Publ. (1967) p. 22]. Suitable reagents include mineral or organic protic acids such as e.g. hydrogen chloride, phosphoric or p-toluenesulfonic acids, or an acidic diatomaceous earth. A reagent such as pyridinium chloride may also be conveniently used.

The said reaction can be effected in the presence of an inert organic solvent. Suitable solvents include e.g. benzene, toluene, methylene chloride, tetrahydrofuran or 1,2-dimethoxyethane, or any mixture of at least two of the above solvents.

The said reaction is preferably carried out at a temperature in the vicinity of the boiling point of the chosen solvent.

β-Pinene-epoxide, used as starting material in the above process, can be obtained from very cheap and easily available material, viz. β-pinene. It may be prepared according to the usual techniques, for example by treating β-pinene with an organic peracid such as performic, peracetic, trifluoroperacetic, perphthalic or m-chloroperbenzoic acid. This treatment is generally carried out in the presence of an inert organic solvent, chloroform, methylene chloride, benzene, toluene or trichloroethylene e.g., and in the presence of a buffer agent such as an alkali metal salt of an organic acid, sodium formate or acetate for example, or in the presence of sodium carbonate.

In accordance with a further embodiment of the present invention, 4-isopropenyl-cyclohex11-enylmethanol may equally be obtained by pyrolysing a compound of formula

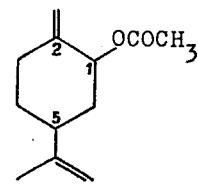

more precisely 2-methylene-5-isopropenyl-cyclohexyl acetate, and subsequently reducing or hydrolysing the ester thus obtained.

It may be assumed that the first step of the above process, probably a thermal rearrangement, follows a reaction pathway which can be visualized as follows:

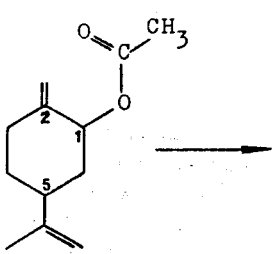 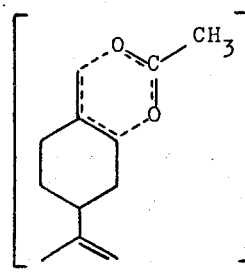 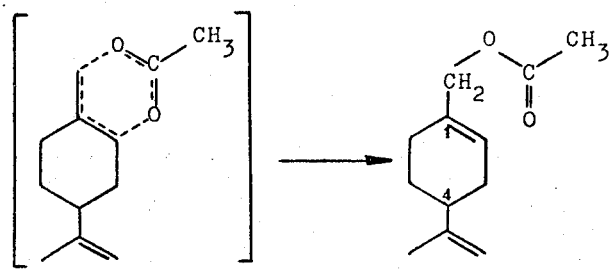

The temperature at which the said thermal rearrangement may be carried out varies within a wide range and may be comprised between 200° and 350° C, preferably it is of about 230° C.

It was also noticed that the pressure did not sensibly effect the course of the reaction so that the pyrolysis may be carried out at a pressure higher than the atmospheric pressure, in a sealed tube e.g., or at normal or subnormal pressure, as described in one of the Examples given hereinafter.

The conversion of 4-isopropenyl-cyclohex-1-enyl acetate into the corresponding alcohol may be effected according to the usual techniques by means of a reduction or a hydrolysis.

2-Methylene-5-isopropenyl-cyclohexyl acetate, used as starting material in the above process, occurs in the form of two stereoisomers, viz.

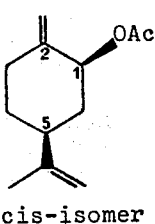 and 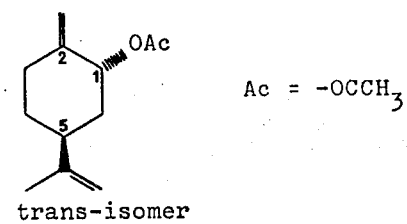

cis-isomer      trans-isomer which may be easily separated one from the other.

The pyrolysis can be carried out on the pure isomers or directly on mixtures thereof. In this respect it was found that the best yields of 4-isopropenyl-cyclohex-1-enyl acetate were obtained when the pyrolysis was carried out on pure trans-2-methylene-5-isopropenyl-cyclohexyl acetate.

With the cis isomer the desired ester derivative was obtained in a yield which did not exceed 15%.

2-Methylene-5-isopropenyl-cyclohexyl acetate can be prepared from very cheap and easily available material, viz. limonene, a by-product of the perfume and flavour industry. The synthesis of the above ester is illustrated hereinafter:

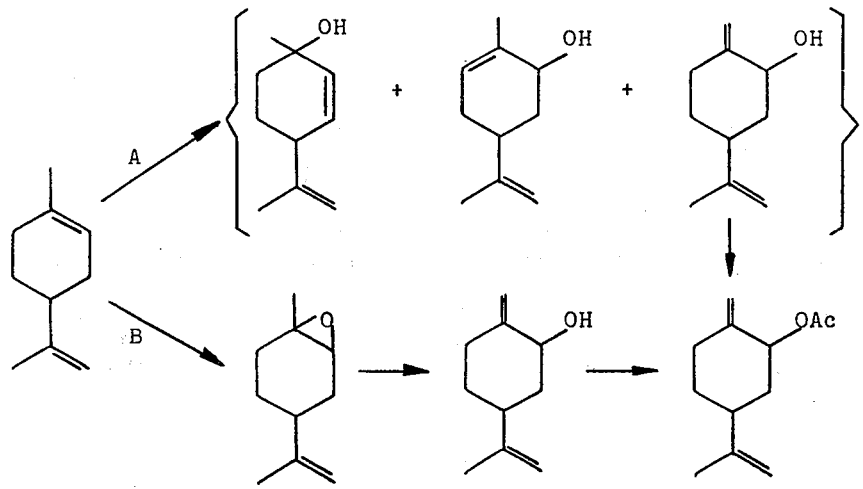

According to method A, limonene is submitted to a dye-sensitized photo-oxygenation, followed by a reduction [see: Liebigs Ann. Chem. 674, 93 (1964)]. There is thus obtained a mixture of secondary and tertiary alcohols, from which the desired alcohol may be isolated by fractional distillation, this latter being finally converted into its acetate derivative in accordance with the usual techniques, for example by means of a treatment with a pyridine-acetic anhydride mixture.

According to method B, limonene is converted into the corresponding monoepoxide — for example according to the method above described for the preparation of β-pineneepoxide — this latter being then converted in the desired alcohol by treatment with a strong base, potassium tert-butoxide for example. The corresponding acetate is finally obtained as indicated hereinabove.

According to a further embodiment of the process of the present invention 4-isopropyl-cyclohexylmethanol is obtained by reducing a compound of formula

known in the art as "cuminic aldehyde". A catalytic hydrogenation of cuminic aldehyde at high pressure and elevated temperature and in the presence of a metal catalyst such as ruthenium on carbon, afforded good yields of mixtures of cis-and trans-4-isopropyl-cyclohexylmethanol.

The said hydrogenation may be carried out at a temperature comprised between about 100° and 200° C, and at a pressure of the of about 50 to 200 atm, preferably at 130° C and 100 atm.

Alicyclic compounds Ia, which are indeed new compounds, can be prepared from their corresponding alcohol derivatives Ic, according to conventional techniques.

The esters of formula Ia, wherein R represents an acyl radical, for instance 4-isopropenyl-cyclohexylmethyl acetate, can be prepared from 4-isopropenyl-cyclohexylmethanol, by treating it with a pyridine-acetic anhydride mixture. The ethers of formula Ia, wherein R represents an alkyl radical, e.g. 4-isopropyl-cyclohexylmethyl ethyl ether, can be obtained from 4-isopropyl-cyclohexylmethanol, by successive treatment with a strong base, sodium ethoxide or sodium hydride, e.g., and ethyl bromide.

The following Examples illustrate the present invention in a more detailed way. In the said Examples the temperatures are given in degrees centigrade.

EXAMPLE 1

4-Isopropenyl-cyclohexylmethanol 10 g of 4-isopropenyl-cyclohex-1-enylmethanol dissolved in 50 ml of ethanol were slowly added to a solution of sodium metal in 200 ml of ammonia. The addition of the reactants was effected in a discontinuous way as follows:

a portion of 200 to 600 mg of sodium metal is first dissolved in ammonia — 2 to 3 ml of the ethanolic solution are then added dropwise, until complete discolouration of the reaction mixture — a new portion of sodium metal is then added. At the end of the reaction 9 g of sodium were used up (reaction time: 4 h). The reaction mixture was then stirred for 1 h, and the unreacted sodium metal was destroyed by the addition of ethanol. After evaporation of ammonia at room temperature, the obtained residue was extracted with 200 ml of ether, then washed with a saturated aqueous solution of NH₄CL, dried over Na₂SO₄ and finally evaporated. On fractional distillation of the obtained residue, 6.5 g of a product having bp 82° – 112°/10 Torr were obtained.

A vapour phase chromatography analysis has shown that the isolated product contained 52% of a 92 : 8 (parts by weight) mixture of cis and trans isomers of the desired compound. This isomeric mixture may be used according to the present invention without any further purification.

The cis and the trans isomers were finally obtained in their pure state by means of a distillation through a spinning band column — bp 98°/10 Torr.

trans-4-Isopropenyl-cyclohexylmethanol

NMR (CCL₄): 1.68 (3H, m, J = 2 cps); 3.83 (2H, d, J = 4 cps); 4.62 (2H, m, J = 2 cps) δ ppm.

MS: M⁺ = 154 (22); m/e = 136 (29), 121 (74), 108 (38), 107 (67), 93 (100), 81 (70), 79 (89), 67 (86), 55 (61).

cis-4-Isopropenyl-cyclohexylmethanol

NMR (CCl₄): 1.68 (3H, m, J = 2 cps); 3.47 (2H, d, J = 6 cps); 4.66 (2H, m, J = 2 cps) δ ppm.

MS: M⁺ = 154 (16); m/e = 136 (37), 121 (68), 107 (85), 93 (100), 81 (83), 79 (97), 67 (93).

EXAMPLE 2

4-Isopropyl-cyclohexylmethanol 10 g of 4-isopropenyl-cyclohex-1-enylmethanol dissolved in 200 ml of ethanol were hydrogenated at atmospheric pressure in the presence of 200 mg of Raney nickel. The reaction mixture was then filtered, evaporated and finally subjected to a fractional distillation. It was thus isolated a product having bp 75° – 115°/10 Torr. The vapour phase chromatography analysis showed that the isolated product contained 50% of a 60 : 40 (parts by weight) mixture of cis and trans isomers of the desired alcohol.

The pure cis and trans isomers were isolated by fractional distillation through a spinning band column — bp 80°/7 Torr.

trans-4-Isopropyl-cyclohexylmethanol

NMR (CCl₄): 0.83 (6H, d, J = 6 cps); 0.9 – 2.0 (11H, m); 3.29 (2H, d J = 3 cps) δ ppm.

MS: m/e = 138 (5), 123 (5), 110 (5), 109 (12), 95 (100), 83 (14), 81 (20), 69 (40 ), 67 (27), 57 (12).

cis-4-Isopropyl-cyclohexylmethanol

NMR (CCl₄): 0.83 (6H, d, J = 6 cps); 1.0 – 2.0 (11H, m); 3.42 (2H, d, J = 4.5 cps) δ ppm.

MS: m/e = 138 (4), 123 (6), 110 (5), 109 (5), 96 (16), 95 (100), 83 (14), 81 (21), 69 (40), 67 (27), 55 (28).

The above two compounds were in all respects identical to the pure samples prepared in accordance with the method described in J. Org. Chem. 31, 3507 (1966).

4-Isopropenyl-cyclohex-1-enylmethanol used as starting material in the preparations described in Examples 1 and 2 may be prepared as indicated hereinbelow:

A. via acidic treatment of β-pinene-epoxide

A solution of 50 g of β-pinene-epoxide in 250 ml of CH₂Cl₂ was slowly added to a cold (− 20°) suspension of 5 g of diatomaceous earth in 1000 ml of CH₂Cl₂. After having been stirred for 2 h, the reaction mixture was filtered, then evaporated under reduced pressure. A fractional distillation of the obtained residue yielded 22 g (45%) of 4-isopropenylcyclohex-1-enylmethanol, bp 67°– 68°/0.1 Torr. This compound was used without any further purification for the subsequent reaction step.

When β-pinene-epoxide was treated with pyridinium chloride in tetrahydrofurane, or phosphoric acid in methylene chloride, analogous results were obtained.

β-Pinene-epoxide used as starting material in the hereinabove preparation can be prepared as follows: to a cold (0°) mixture of 272 g of β-pinene, 636 g of Na₂CO₃ and 1000 ml of CH₂Cl₂, there were added dropwise 420 g of 40% peracetic acid containing 10 g of anhydrous sodium acetate. After having been stirred for 15 h at room temperature, the reaction mixture was washed with water, dried and evaporated. After distillation of the obtained residue, 250 g (83%) of the desired epoxide were isolated, bp 45°/0.1 Torr.

B. via pyrolysis of 2-methylene-5-isopropenyl-cyclohexyl acetate 1. 5.0 g of trans-2-methylene-5-isopropenyl-cyclohexyl acetate were heated in a sealed PYREX tube, at 230° for 10 h. On fractional distillation of the obtained reaction mixture, 3.6 g (76%) of 4-isopropenyl-cyclohex-1-enylmethyl acetate were isolated.

| $[\alpha]_D^{20} = +77.7°$ | (in CHCl₃) |
|---|---|
| $d_4^{20} = 0.9821$ | $n_D^{20} = 1.4798$ |

2. 10.0 g of trans-2-methylene-5-isopropenyl-cyclohexyl acetate were evaporated at 10 Torr, in an apparatus comprising an evaporation vessel connected with a PYREX pyrolysis tube of the length of 20 cm, and heated at 350°. By condensing the vapours formed during the pyrolysis, there were obtained 8.2 g of an oily product containing 70% of the desired ester and 30% of p-cymol, according to a vapour phase chromatography analysis.

The obtained acetate — see sections 1 and 2 above — was then converted into 4-isopropenyl-cyclohex-enylmethanol by reducing it with lithium aluminiumhydride.

When cis-2-methylene-5-isopropenyl-cyclohexyl acetate was subjected to the above pyrolysis — see sections 1 and 2 above — there were obtained mixtures containing about 75% of p-cymol, 15% of 4-isopropenyl-cyclohexylmethyl acetate and 10% of unidentified material.

2-Methylene-5-isopropyl-cyclohexyl acetate used as starting material in the hereinabove described preparation can be prepared as follows:

136 g of limonene were epoxidized as above indicated for β-pinene. After the usual treatments of purification 130 g (85%) of limonene-epoxide were isolated, bp 73°/8 Torr.

| $[\alpha]_D^{20} = +65.1°$ | (in CHCl₃) |
|---|---|
| $d_4^{20} = 0.9241$ | $n_D^{20} = 1.4673$ |

15.2 g of the above epoxide, 11.2 g of freshly sublimated potassium tert-butoxide and 150 ml of anhydrous dioxan were heated under a nitrogen atmosphere, at 50° for 60 h. The reaction mixture was then poured onto crushed ice, extracted with hexane and the organic layer was washed, dried and evaporated according to the usual techniques. After distillation of the obtained residue — 60° – 70°/0.05 Torr — there were isolated 9.8 g (65%) of a 40 : 60 (parts by weight) mixture of cis and trans-2-methylene-5-isopropenyl-cyclohexanol. The two isomers were separated from the above mixture in their pure state by means of a distillation through a VIGREUX column.

trans-2-Methylene-5-isopropenyl-cyclohexanol

| $[\alpha]_D^{20} = +93.9°$ | (in $CHCl_3$) |
|---|---|
| $d_4^{20} = 0.9429$ | $n_D^{20} = 1.4943$ | cis-2-Methylene-5-isopropyl-cyclohexanol

| $[\alpha]_D^{20} = -25.0°$ | (in $CHCl_3$) |
|---|---|
| $d_4^{20} = 0.9533$ | $n_D^{20} = 1.4958$ |

8.0 g of cis-2-methylene15-isopropenyl-cyclohexanol were then treated with a mixture of 120 ml of acetic anhydride and 16 ml of pyridine — 3h at the boiling temperature. The reaction mixture was diluted with water, extracted with ether and the organic layer washed, dried and evaporated according to the usual techniques. The distillation — bp 50° – 53°/0.1 Torr - of the obtained residue yielded 8.2 g (90%) of pure cis-2-methylene-5-isopropenyl-cyclohexyl acetate.

| $[\alpha]_D^{20} = +41.9°$ | (in $CHCl_3$) |
|---|---|
| $d_4^{20} = 0.9459$ | $n_D^{20} = 1.4600$ | trans-2-Methylene-5-isopropenyl-cyclohexyl acetate was obtained in an analogous way starting from trans-2-methylene-5-isopropenyl-cyclohexanol.

| $[\alpha]_D^{20} = +32.4°$ | (in $CHCl_3$) |
|---|---|
| $d_4^{20} = 0.9679$ | $n_D^{20} = 1.4741$ |

EXAMPLE 3

4-Isopropyl-cyclohexylmethanol

A mixture of 200 g of cuminic aldehyde, 200 g of 1,2-dimethoxy-ethane and 6 g of ruthenium — 5% on charcoal; Doduco Chemie Werk, Sinsheim Elsenz, West Germany — were heated in a stainless steel autoclave at 130° and at a pressure of 100 atm, for 25 h. The obtained reaction mixture was then filtered and subjected to a fractional distillation to yield 176 g (85%) of a 70 : 30 (parts by weight) mixture of cis and trans-4-isopropyl-cyclohexylmethanol.

The obtained mixture can be used, in accordance with the present invention, without any further purification.

EXAMPLE 4

4-Isopropenyl-cyclohexylmethyl acetate 3.9 g of cis-4-isopropenyl-cyclohexylmethanol, 50 ml of acetic anhydride and 20 ml of pyridine were kept overnight at room temperature. The reaction mixture was then poured onto crushed ice and extracted with ether. The organic layer was successively washed with a 2N solution of $Na_2CO_3$, HCl at 10% in water and finally with a saturated aqueous NaCl solution. After the usual treatments of drying and evaporation, the fractional distillation of the obtained residue yielded 3.2 g (65%) of cis-4-isopropenyl-cyclohexylmethyl acetate, bp 105° – 108°/10 Torr.

NMR ($CCl_4$): 1.5 – 1.6 (ca. 9H, m); 1.68 (3H, d, J = 1 cps); 1.93 (3H, s); 3.96 (2H, d, J = 7 cps); 4.67 (2H, s) δ ppm.

MS: $M^+$ = 196 (4); m/e = 136 (39), 121 (46), 107 (70), 93 (88), 79 (67), 67 (44), 43 (100).

trans-4-Isopropenyl-cyclohexylmethyl acetate was obtained in an analogous manner from the corresponding alcohol.

NMR ($CCl_4$): 0.9 – 2.0 (ca. 9H, m); 1.68 (3H, d, J = 1 cps); 1.93 (3H, s); 3.80 (2H, d, J = 5 cps); 4.61 (2H, s) δ ppm.

MS: $M^+$ = 196 (8).

EXAMPLE 5

4-Isopropyl-cyclohexylmethyl acetate 3.5 g of cis-4-isopropyl-cyclohexylmethanol were subjected to the treatment described in Example 4 to yield cis-4-isopropyl-cyclohexylmethyl acetate, bp 110°/10 Torr.

NMR ($CCl_4$): 0.85 (6H, d, J = 6 cps); 1.0 – 1.9 (11H, m); 1.93 (3H, s); 3.92 (2H, d, J = 7 cps) δ ppm.

MS: m/e = 138 (14), 123 (11), 109 (22), 95 (100), 82 (20), 43 (63).

trans-4-Isopropyl-cyclohexylmethyl acetate was prepared from the corresponding alcohol as described in Example 4.

NMR ($CCl_4$): 0.84 (6H, d, J = 6 cps); 0.9 – 1.9 (11H, m); 1.91 (3H, s); 3.77 (2H, d, J = 5 cps) δ ppm.

EXAMPLE 6

4-Isopropenyl-cyclohexylmethyl ethyl ether 6 g of sodium hydride — 50% in mineral oil — were allowed to react with 100 ml of dimethyl-sulfoxide, at 55° – 60° for 90 min. 7.5 g of cis-4-isopropenyl-cyclohexylmethanol were then added to the resulting solution, followed by a dropwise addition of 20 g of ethyl bromide. The reaction mixture was stirred overnight at room temperature, then poured onto crushed ice and finally extracted with hexane. After the usual treatments of washing, drying and evaporation, the fractional distillation of the obtained residue yielded cis-4-isopropenyl-cyclohexylmethyl ethyl ether, bp 96° – 97°/10 Torr.

NMR ($CCl_4$): 1.11 (3H, t, J = 6.5 cps); 1.67 (3H, d, J = 1 cps); 3.25 (2H, d, J = 6 cps); 3.36 (2H, q, J = 6.5 cps); 4.63 (2H, d, J = 1 cps) δ ppm.

MS: $M^+$ = 182 (18); m/e = 136 (79), 121 (70), 107 (100), 93 (96), 81 (83), 79 (84), 67 (78), 59 (63), 41 (73).

trans-4-Isopropenyl-cyclohexylenethyl ether was obtained as indicated hereinabove, from the corresponding alcohol.

NMR ($CCl_4$): 1.10 (3H, t, J = 6.5 cps); 1.65 (3H, d, J = 1 cps); 3.11 (2H, d, J = 5 cps); 3.35 (2H, q, J = 6.5 cps); 4.59 (2H, broad s) δ ppm.

MS: $M^+$ = 182 (29); m/e = 136 (67), 121 (65), 108 (65), 107 (100), 93 (85), 81 (64), 67 (60), 59 (43).

EXAMPLE 7

4-Isopropyl-cyclohexylmethyl ethyl ether cis-4-Isopropyl-cyclohexylmethanol was converted into the corresponding ether in accordance with the method given in Example 6.

NMR (CCl$_4$): 0.84 (6H, d, J = 6 cps); 1.11 (3H, t, J = 6.5 cps); 3.23 (2H, d, J = 1.7 cps); 3.35 (2H, q, J = 7 cps) δ ppm.

MS: m/e = 138 (33), 109 (37), 95 (100), 82 (35), 81 (41), 69 (62), 59 (45), 55 (35).

EXAMPLE 8

A base perfume composition of the "Flowery" type was prepared by mixing the following ingredients (parts by weight):

| | |
|---|---|
| Phenyl-ethyl alcohol | 350 |
| α-Amyl-cinnamic aldehyde | 300 |
| Dimethyl-benzyl-carbinol | 200 |
| α-Methyl-4-isopropyl-dihydrocinnamic aldehyde | 50 |
| Linalol | 40 |
| Terpineol | 30 |
| 4-Methyl-phenylacetic aldehyde 50 %* | 20 |
| Undecylenic aldehyde 10 %* | 10 |
| Total | 1000 |

*in diethyl phthalate

By adding 20 g of cis-4-isopropenyl-cyclohexylmethanol (isomeric purity > 99%) to 80 g of the above base, it was obtained a new composition possessing a particularly pleasant odour reminiscent of that of honeysuckle.

When 20 g of cis-4-isopropyl-cyclohexylmethanol (isomeric purity > 99%) were added to 80 g of the same base, it was obtained a new composition possessing a well defined flowery odour, reminiscent of that of cyclamen or lily of the valley.

When cis-4-isopropyl-cyclohexylmethanol was replaced, in the above composition, by a 60 : 40 or a 70 : 30 (parts by weight) mixture of cis and trans-4-isopropyl-cyclohexylmethanol, the effect achieved was similar, the obtained flowery note possessing a more or less diffused character.

Analogous effects, although less pronounced, were also observed when the corresponding ether or ester derivatives were substituted for the above alcohols.

EXAMPLE 9

A flavouring base composition of the "Tutti-Frutti" type was prepared by mixing the following ingredients (parts by weight):

| | |
|---|---|
| Vanillin | 25 |
| Allyl caproate | 10 |
| Citral | 15 |
| Amyl butyrate | 35 |
| Sweet orange oil | 50 |
| Ethyl butyrate | 75 |
| Ethyl acetate | 150 |
| Amyl acetate | 150 |
| Lemon oil | 250 |
| Orange terpenes | 240 |
| Total | 1000 |

The following compositions were then prepared as indicated hereinbelow (parts by weight):

| | A (test) | B (control) |
|---|---|---|
| Base composition | 100 | 100 |
| 4-Isopropenyl-cyclohexyl-methanol (99 % of the cis isomer) | 100 | — |
| Ethyl alcohol | 800 | 900 |
| Total | 1000 | 1000 |

Both mixtures A and B were then used for the preparation of the following foodstuffs, in the proportions of 100 g of flavouring composition per 100 kg of foodstuff.

Ice-cream:
a base mixture was prepared from one liter of milk, 5 egg yolks and 250 g of sugar in the following manner: the milk was heated, the sugar and the egg yolks were mixed and the hot milk was then added to the obtained mixture while stirring. Stirring was conntinued until the mass thickened and the flavour was added. The mixture thus obtained was finally frozen in the usual manner.

Pudding:
a mixture of 60 g of sugar and 3 g of pectine was added to 500 ml of hot milk, while stirring. The mixture was brought to boiling for a few seconds, the flavour was added and the mixture was allowed to cool.

The foodstuffs thus flavoured were then subjected to the evaluation of a panel of flavour experts who declared that all the tasted samples presented a particularly pleasant fruity and flowery note, better defined than that of unflavoured material. This typical gustative note was reminiscent of that of melon or apricot.

By replacing the above alcohol by one of the corresponding, saturated or unsaturated, ether or ester derivatives analogous effects were observed, although less pronounced.

What is claimed is:

1. A process for improving, enhancing or modifying the organoleptic properties of perfumes, perfumed products, natural or artificial essential oils which comprises adding thereto a small but effective amount of at least one compound of formula

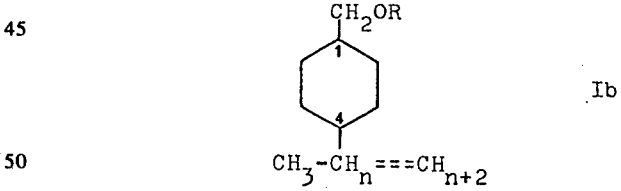

possessing a single or a double bond in the position indicated by the dotted line, and wherein the index n stands for the integers zero or one, and the symbol R represents a hydrogen atom, an alkyl or an acyl radial containing from 1 to 6 carbon atoms.

2. A perfume or a flavour-modifying composition comprising as an active ingredient at least one compound of formula:

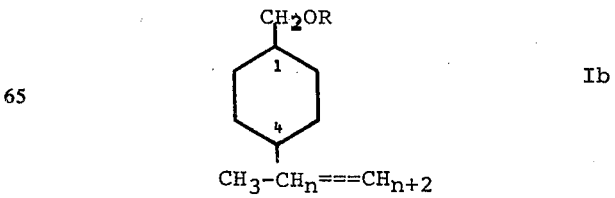

possessing a single or a double bond in the position indicated by the dotted line, and wherein the index n stands for the integers zero or one, and the symbol R represents a hydrogen atom, an alkyl or an acyl radical containing from 1 to 6 carbon atoms, together with a diluent or carrier.

3. A composition according to claim 2 wherein the compound Ib is cis-4-isopropenyl-cyclohexylmethanol.

4. A composition according to claim 2 wherein the compound Ib is cis- or trans-4-isopropyl-cyclohexylmethanol, or any mixture thereof.

5. A process according to claim 1 for improving, enhancing or modifying the organoleptic properties of perfumes, perfumed products, natural or artificial essential oils which comprises adding thereto a small but effective amount of at least one compound of formula

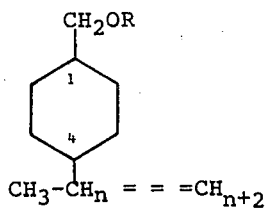

Ib possessing a single or a double bond in the position indicated by the dotted line, and wherein the index $n$ stands for the integers zero or one, and the symbol R represents a hydrogen atom or acyl radical containing from 1 to 6 carbon atoms.

6. A perfume or flavour-modifying composition consisting essentially of at least one compound of the formula:

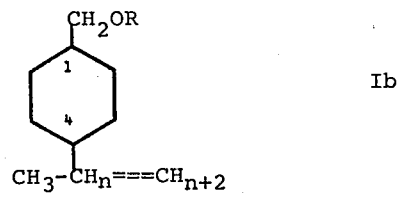

Ib possessing a single or a double bond in the position indicated by the dotted line, and wherein the index $n$ stands for the integers zero or one, and the symbol R represents a hydrogen atom, an alkyl or an acyl radical containing from 1 to 6 carbon atoms.

* * * * *

UNITED STATES PATENT AND TRADEMARK OFFICE
CERTIFICATE OF CORRECTION

PATENT NO. : 3,993,604
DATED : November 23, 1976
INVENTOR(S) : Alan Francis Thomas and Gunther Ohloff It is certified that error appears in the above-identified patent and that said Letters Patent are hereby corrected as shown below:

Column 2, line 34, "Glide - meister" should read
--Gildemeister--.

Column 4, line 39, "and" should read --an--.

Column 4, line 65, "p.507" should read --p. 50]--.

Column 5, line 11, "exables" should read --enables--.

Column 6, line 13, "cyclohex11" should read --cyclohex-1--.

Column 8, line 5, "of the of about" should read
--of the order of about--.

Column 9, line 1, "NH4CL" should read --NH4Cl--.

Column 9, line 17, "(CCL4)" should read --(CCl4)--.

Column 11, line 24, "methylene15" should read
--methylene-5--.

Column 12, line 19, "4,61" should read --4.61--.

Signed and Sealed this

Seventeenth Day of May 1977

[SEAL]

Attest:

RUTH C. MASON
*Attesting Officer*

C. MARSHALL DANN
*Commissioner of Patents and Trademarks*